United States Patent
Ito et al.

(10) Patent No.: US 6,619,330 B2
(45) Date of Patent: Sep. 16, 2003

(54) FUEL HOSE

(75) Inventors: Hiroaki Ito, Kasugai (JP); Hirokazu Kitamura, Kasugai (JP)

(73) Assignee: Tokai Rubber Industries, Ltd., Komaki (JP)

(*) Notice: Subject to any disclaimer, the term of this patent is extended or adjusted under 35 U.S.C. 154(b) by 0 days.

(21) Appl. No.: 10/350,267

(22) Filed: Jan. 24, 2003

(65) Prior Publication Data

US 2003/0150503 A1 Aug. 14, 2003

(30) Foreign Application Priority Data

Jan. 24, 2002 (JP) .................................. 2002-016178
Sep. 24, 2002 (JP) .................................. 2002-277444

(51) Int. Cl.[7] .................................................. F16L 1/00
(52) U.S. Cl. ................. 138/137; 138/140; 138/DIG. 7; 428/36.9
(58) Field of Search .................. 138/137, 140, 138/141, 118, DIG. 7; 428/35.7, 36.9

(56) References Cited

U.S. PATENT DOCUMENTS

| | | | | |
|---|---|---|---|---|
| 5,380,571 A | * | 1/1995 | Ozawa et al. ............... | 428/36.9 |
| 5,390,705 A | * | 2/1995 | Brunnhofer ................. | 138/137 |
| 5,474,109 A | * | 12/1995 | Stoeppelmann et al. .... | 138/137 |
| 5,932,686 A | * | 8/1999 | Hoff ........................... | 528/288 |
| 5,937,911 A | * | 8/1999 | Kodama et al. ............. | 138/137 |
| 6,089,278 A | * | 7/2000 | Nishino et al. ............. | 138/137 |
| 6,166,143 A | * | 12/2000 | Watanabe et al. ........... | 525/208 |
| 6,355,321 B1 | * | 3/2002 | Nishino et al. .......... | 428/36.91 |
| 6,469,092 B1 | * | 10/2002 | Stoppelmann et al. ...... | 524/495 |

FOREIGN PATENT DOCUMENTS

| | | |
|---|---|---|
| JP | 2002-213655 | 7/2002 |
| JP | 2002-267054 | 9/2002 |

* cited by examiner

Primary Examiner—Patrick Brinson
(74) Attorney, Agent, or Firm—Armstrong, Westerman & Hattori, LLP

(57) ABSTRACT

A fuel hose which is less permeable to an automotive fuel and highly resistant to a sour gasoline. The fuel hose comprises at least one layer including an innermost layer which comprises a thermoplastic polybutylene terephthalate elastomer containing a dimer acid moiety.

6 Claims, 1 Drawing Sheet

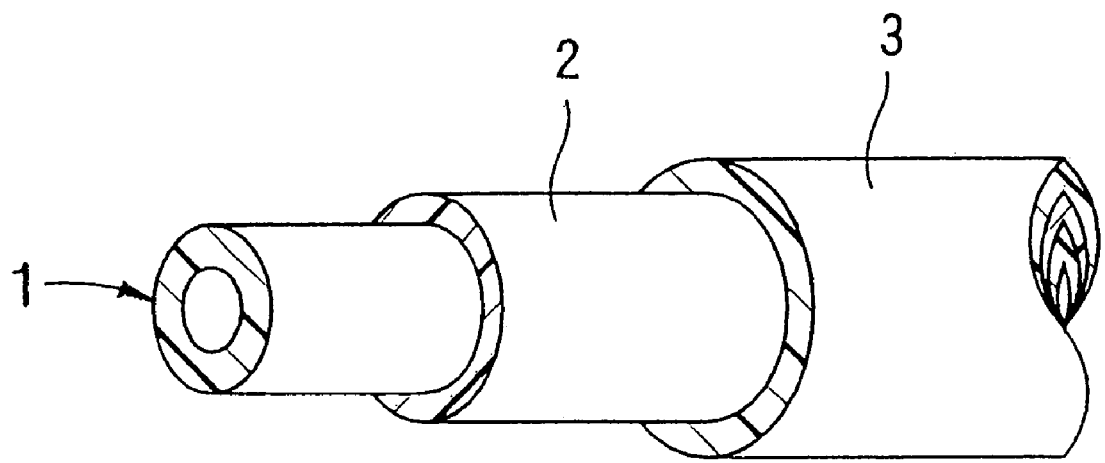
Figure

FUEL HOSE

BACKGROUND OF THE INVENTION

1. Field of the Invention

The present invention relates to a fuel hose for use as a fuel transportation pipe for transporting an automotive fuel such as a gasoline, an alcohol-containing gasoline (gasohol), an alcohol, hydrogen, liquified petroleum gas (LPG), compressed natural gas (CNG), light oil or dimethyl ether.

2. Description of the Art

To cope with more stringent regulations against vapor emission of automotive fuel gases in recent years, various types of low-permeability automotive fuel hoses have been investigated. Exemplary low-permeability fuel hoses hitherto proposed are those produced by employing polyester resins such as polybutylene naphthalate (PBN) and polybutylene terephthalate (PBT) which are less permeable to fuels. However, where a hose of a single layer structure is produced by employing such a polyester resin alone, the hose has poor flexibility because the polyester resin (PBN, PBT etc.) is highly rigid. Therefore, it is a common practice to laminate a thin polyester resin layer and a thermoplastic resin layer for production of a low-permeability fuel hose.

However, a polyester resin (PBN, PBT etc.) does not adhere well to other types of materials. Therefore, in the above hose, the polyester resin layer and the thermoplastic resin layer should be laminated by providing an adhesive layer therebetween, correspondingly complicating the production process. To this end, a hose has been proposed which includes an innermost layer of a thermoplastic polyester elastomer provided on the inner periphery of a polyester resin layer such as of the PBN or the PBT. Since the innermost layer and the polyester resin layer provided on the outer periphery of the innermost layer are both polyester-based, the innermost layer and the polyester resin layer can be laminated without the use of an adhesive by co-extruding the thermoplastic polyester elastomer and the polyester resin (e.g., PBN). However, the inventors of the present invention found, as a result of further studies on this hose, that the innermost layer of the thermoplastic polyester elastomer is unsatisfactory in sour gasoline resistance (resistance to a sour gasoline generated through oxidation of a gasoline) which is an important property required in hose applications for fuels.

In view of the foregoing, it is an object of the present invention to provide a fuel hose which is less permeable to automotive fuels and highly resistant to sour gasoline.

SUMMARY OF THE INVENTION

In accordance with the present invention to achieve the aforesaid object, there is provided a fuel hose which comprises at least one layer including an innermost layer comprising a thermoplastic polybutylene terephthalate elastomer containing a dimer acid moiety.

The inventors of the present invention conducted studies to determine the reason a hose which has an innermost layer composed of the thermoplastic polyester elastomer tends to be inferior in sour gasoline resistance, and discovered that a polyether contained as a soft segment in the thermoplastic polyester elastomer is liable to be eroded by a peroxide in the sour gasoline, thereby resulting in the deterioration of the hose. As a result of further research and development, the inventors found that where a dimer acid moiety is introduced into a thermoplastic polybutylene terephthalate (PBT) elastomer containing polybutylene terephthalate (PBT) as a hard segment to reduce the proportion of the soft segment (polyether) or to entirely replace the soft segment with the dimer acid moiety, the innermost layer is less likely to be eroded by the peroxide in the sour gasoline, whereby the hose tends to be free from deterioration by having an improved sour gasoline resistance. Thus, the present invention has been attained.

BRIEF DESCRIPTION OF THE DRAWING

The sole FIGURE of the drawing is a diagram illustrating the construction of an exemplary fuel hose according to the present invention.

DESCRIPTION OF THE PREFERRED EMBODIMENTS

The present invention will hereinafter be described in detail by way of embodiments thereof.

As shown in the FIGURE, a fuel hose according to the present invention includes an inner layer 1, a barrier layer 2 provided on the outer periphery of the inner layer 1, and an outer layer 3 provided on the outer periphery of the barrier layer 2. An important feature of the present invention is that the inner layer 1 comprises a thermoplastic polybutylene terephthalate elastomer containing a moiety of a dimer acid.

The thermoplastic polybutylene terephthalate elastomer (PBT-TPE) containing the dimer acid moiety is employed as a material for the inner layer 1.

The dimer acid is a dimer obtained through a reaction of two molecules of an organic acid. Examples of the dimer acid include aliphatic dimer acids, alicyclic dimer acids and aromatic dimer acids, which may be used either alone or in combination.

Examples of aliphatic dimer acids include dimer acids represented by the following general formulae (1) and (2), which may be used either alone or in combination.

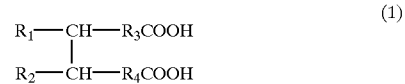

wherein $R_1$ and $R_2$, which may be the same or different, are alkyl groups; $R_3$ and $R_4$, which may be the same or different, are alkylene groups; and a total carbon number of $R_1$ to $R_4$ is preferably 24 to 36.

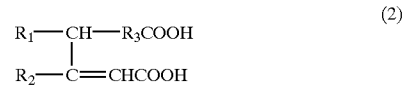

wherein $R_1$ and $R_2$, which may be the same or different, are alkyl groups; $R_3$ is an alkylene group; and a total carbon number of $R_1$ to $R_3$ is preferably 24 to 36.

Examples of alicyclic dimer acids include dimer acids represented by the following general formulae (3) to (6), which may be used either alone or in combination.

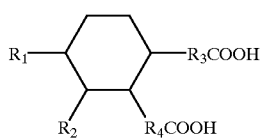

(3)

wherein $R_1$ and $R_2$, which may be the same or different, are alkyl groups; $R_3$ and $R_4$, which may be the same or different, are alkylene groups; and a total carbon number of $R_1$ to $R_4$ is preferably 24 to 36.

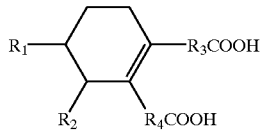

(4)

wherein $R_1$ and $R_2$, which may be the same or different, are alkyl groups; $R_3$ and $R_4$, which may be the same or different, are alkylene groups; and a total carbon number of $R_1$ to $R_4$ is preferably 24 to 36.

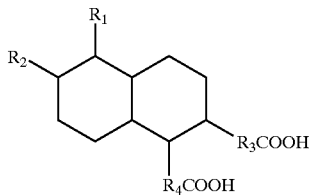

(5)

wherein $R_1$ and $R_2$, which may be the same or different, are alkyl groups; $R_3$ and $R_4$, which may be the same or different, are alkylene groups; and a total carbon number of $R_1$ to $R_4$ is preferably 24 to 36.

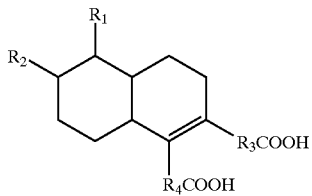

(6)

wherein $R_1$ and $R_2$, which may be the same or different, are alkyl groups; $R_3$ and $R_4$, which may be the same or different, are alkylene groups; and a total carbon number of $R_1$ to $R_4$ is preferably 24 to 36.

Examples of aromatic dimer acids include dimer acids represented by the following general formula (7).

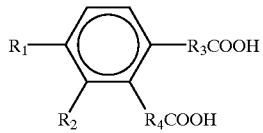

(7)

wherein $R_1$ and $R_2$, which may be the same or different, are alkyl groups; $R_3$ and $R_4$, which may be the same or different, are alkylene groups; and a total carbon number of $R_1$ to $R_4$ is preferably 24 to 36.

More specific examples of preferred dimer acids include acids sold under the trade name PRIPOL 1008 by Uniqema of Gouda, the Netherlands (a hydrogenated dimer acid product containing an aromatic dimer acid, an alicyclic dimer acid and an aliphatic dimer acid in a molar ratio of 9:54:37 (carbon number: 36)), Uniqema's PRIPOL 1009 (a hydrogenated dimer acid product containing an aromatic dimer acid, an alicyclic dimer acid and an aliphatic dimer acid in a molar ratio of 13:64:23 (carbon number: 36)), Uniqema's PRIPOL 1098 (an unhydrogenated dimer acid product containing an aromatic dimer acid, an alicyclic dimer acid and an aliphatic dimer acid in a molar ratio of 13:64:23 (carbon number: 36)), Uniqema's PRIPLASTA 3008 (a dimethyl ester product of PRIPOL 1008), and Uniqema's PRIPLASTA 1899 (a dimethyl ester product of PRIPOL 1009). Among these dimer acid products, the hydrogenated dimer acid products (PRIPOL 1008, PRIPOL 1009, PRIPLASTA 3008 and PRIPLASTA 1899) are particularly preferred.

The PBT-TPE containing the dimer acid moiety may be prepared, for example, by partly substituting terephthalic acid (TPA: a material for the PBT) with the dimer acid. For the preparation of the PBT-TPE containing the dimer acid moiety, a polyether or a polyester as a soft segment may be copolymerized with the dimer acid.

The proportion of the soft segment in the PBT-TPE containing the dimer acid moiety is preferably not greater than 20 wt % from the viewpoint of sour gasoline resistance.

An example of the polyether to be copolymerized with the dimer acid is polytetramethylene glycol (PTMG). Examples of the polyester to be copolymerized with the dimer acid include polybutylene adipate (PBA) and poly-ε-caprolactone.

The proportion of the dimer acid moiety in the PBT-TPE containing the dimer acid is preferably 1 mol % to 12 mol %, particularly preferably 1.5 mol % to 11 mol %. If the proportion of the dimer acid moiety is smaller than 1 mol %, flexibility tends to be deteriorated. If the proportion of the dimer acid moiety is greater than 12 mol %, th crystallinity of the PBT tends to be reduced, resulting in reduction of gasoline resistance and mechanical strength.

The PBT-TPE containing the dimer acid moiety preferably has a flexural modulus of 200 MPa to 2000 MPa, particularly preferably 300 MPa to 2000 MPa.

The innermost layer material may further contain an electrically conductive material such as carbon black, carbon nano-tubes or metal powder. The material tends to dissipate static electricity generated by a fuel pump out of the hose to help prevent accidents such as ignition of a fuel (gasoline) which may otherwise occur due to the static electricity.

A material for the barrier layer 2 provided on the outer periphery of the inner layer 1 is not particularly limited, but a polyester resin is preferably used as the barrier layer material. Particularly preferred examples of the polyester resin include a polybutylene naphthalate (PBN) resin, a polybutylene terephthalate (PBT) resin, a polyethylene naphthalate (PEN) resin and a polyethylene terephthalate (PET) resin. Further, an elastomer blend containing any of these polyester resins as a matrix may be employed as the barrier layer material.

The PBT resin may be prepared by a DMT method employing dimethyl terephthalate (DMT) and 1,4-butanediol as starting materials, or by a direct polymerization method employing terephthalic acid (TPA) and 1,4-butanediol as starting materials.

The PBN resin may be prepared by an ester exchange method employing 2,6-dimethyl naphthalate (DMN) and 1,4-butanediol as starting materials, or by a direct polymerization method employing 2,6-naphthalene dicarboxylic acid and 1,4-butanediol as starting materials.

The PEN resin may be prepared by an ester exchange method employing 2,6-dimethyl naphthalate (DMN) and ethylene glycol as starting materials, or by a direct polymerization method employing 2,6-naphthalene dicarboxylic acid and ethylene glycol as starting materials.

The PET resin may be prepared by a DMT method employing dimethyl terephthalate (DMT) and ethylene glycol as starting materials, or by a direct polymerization method employing terephthalic acid (TPA) and ethylene glycol as starting materials.

Like the inner layer material, the barrier layer material may further contain an electrically conductive material such as carbon black, carbon nano-tubes or metal powder so as to have electrical conductivity.

A material for the outer layer 3 provided on the outer periphery of the barrier layer 2 is not particularly limited, but a thermoplastic polyester elastomer is preferably used as the outer layer material. Particularly preferred examples of the thermoplastic polyester elastomer include a thermoplastic polybutylene naphthalate elastomer (PBN-TPE) and a thermoplastic polybutylene terephthalate elastomer (PBT-TPE).

Like the inner layer material, the outer layer material may further contain an electrically conductive material such as carbon black, carbon nano-tubes or metal powder so as to have electrical conductivity.

The inventive fuel hose is produced, for example, in the following manner. The inner layer material essentially containing the PBT-TPE containing the dimer acid moiety, the barrier layer material of the polyester resin (e.g., polybutylene naphthalate (PBN)) and the outer layer material of the thermoplastic polyester elastomer (e.g., thermoplastic PBT elastomer) are prepared. Then, the respective layer materials are co-extruded by means of an extruder capable of simultaneous formation of the three layers, are in turn sized by a vacuum sizing method, and then cooled to solidification in a cooling water bath. Thus, the intended fuel hose (see the Figure) is produced. The inventive fuel hose may partially have a bellows structure which is formed by means of a corrugator.

Although the inner layer 1, the barrier layer 2 and the outer layer 3 are simultaneously formed by the co-extrusion in the aforesaid production method, the production method is not limited thereto. For example, the inner layer material may first be extruded around a mandrel for formation of the inner layer 1. Then the barrier layer material and the outer layer material may successively be extruded around the inner layer 1 for formation of the barrier layer 2 and the outer layer 3.

The inner layer 1 of the inventive fuel hose thus produced typically has a thickness of 0.01 mm to 0.5 mm, preferably 0.1 mm to 0.4 mm. The barrier layer 2 typically has a thickness of 0.01 mm to 0.5 mm, preferably 0.05 mm to 0.4 mm. The outer layer 3 typically has a thickness of 0.1 mm to 3 mm, preferably 0.3 mm to 1 mm. The inventive fuel hose typically has an inner diameter of 3 mm to 60 mm, preferably 4 mm to 30 mm.

The structure of the inventive fuel hose is not limited to the three-layer structure shown in the Figure, as long as the innermost layer is composed of the aforesaid PBT-TPE containing the dimer acid moiety. The fuel hose may be of a single layer structure, a two-layer structure, or a multi-layer structure having four or more layers. In the present invention, a single layer structure means that the single layer is the innermost layer. For example, the inventive fuel hose may be, preferably, of a five layer structure having a first intermediate layer provided on the inner periphery of the barrier layer 2 and a second intermediate layer provided on the outer periphery of the barrier layer 2 (i.e., inner layer 1/first intermediate layer/barrier layer 2/second intermediate layer/outer layer 3).

An exemplary material for the first and second intermediate layers is a blend of a PBT and a polyolefin elastomer. The blend of the PBT and the polyolefin elastomer is advantageous, because the blend has excellent low-temperature impact resistance and adhesiveness to the barrier layer, and is less expensive than PBN.

The inventive fuel hose is advantageously employed as an automotive fuel hose. In addition, the inventive fuel hose may be employed as a fuel hose for a tractor or a farm tractor.

Next, an explanation will be given to examples and comparative examples.

Prior to the explanation of the examples and the comparative examples, the materials herein employed will be explained.

PRT-TPE Containing Dimer Acid Moiety

PBTS01562 (containing Uniqema's PRIPOL 1008 as a dimer acid moiety in a proportion of 6 mol % and having a flexural modulus of 650 MPa) available from Kanebo Gohsen, Ltd. of Osaka, Japan.

PBN Resin

TQB-TO (having a flexural modulus of 2100 MPa) available from Teijin Chemicals, Ltd. of Tokyo, Japan.

PBT Resin

CELANEX 2001 (having a flexural modulus of 2450 MPa) available from Polyplastics Co., Ltd. of Tokyo, Japan.

PEN Resin

TEONEX TN8770 (having a flexural modulus of 2300 MPa) available from Teijin Chemicals, Ltd. of Tokyo, Japan.

PBN-TPE

PERPRENE EN5030 (having a flexural modulus of 470 MPa) available from Toyobo Co., Ltd. of Osaka, Japan.

PBT-TPE (1)

HYTREL 7277R07 (having a flexural modulus of 570 MPa) available from E.I. DuPont de Nemours & Company of Wilmington, USA.

PBT-TPE (2)

HYTREL 5577R07 (having a flexural modulus of 200 MPa) available from DuPont-Toray Co., Ltd. of Tokyo, Japan.

EXAMPLES 1 TO 6 AND COMPARATIVE EXAMPLES 1 AND 2

An inner layer material, a barrier layer material and an outer layer material as shown in Tables 1 and 2 were prepared for each of fuel hoses of Examples 1 to 6 and Comparative examples 1 and 2. The inner layer material, the barrier layer material and the outer layer material were co-extruded by an extruder capable of simultaneous formation of three layers, which were in turn cooled to solidification in a cooling water bath. Thus, a fuel hose was produced, which had a 0.2 mm thick inner layer, a 0.1 mm thick barrier layer provided on the outer periphery of the inner layer and a 0.7 mm thick outer layer provided on the outer periphery of the barrier layer, and had an inner diameter of 6 mm and an outer diameter of 8 mm.

EXAMPLES 7 AND 8

An inner layer material, a first intermediate layer material, a barrier layer material, a second intermediate layer material and an outer layer material as shown in Table 2 were prepared for each of fuel hoses of Examples 7 and 8. The inner layer material, the first intermediate layer material, the barrier layer material, the second intermediate layer material and the outer layer material were co-extruded by an extruder capable of simultaneous formation of five layers, which were in turn cooled to solidification in a cooling water bath. Thus, a fuel hose was produced, which had a 0.05 mm thick inner layer, a 0.2 mm thick first intermediate layer, 0.1 mm thick barrier layer, 0.2 mm thick second intermediate layer and a 0.45 mm thick outer layer sequentially stacked in this order, and had an inner diameter of 6 mm and an outer diameter of 8 mm.

The fuel hoses of the examples and the comparative examples thus produced were evaluated for characteristic properties thereof in the following manners. The results of the evaluation are shown in Tables 1 and 2.

Permeability to Gasoline

Opposite end portions of a 10 m long fuel hose (having an inner diameter of 6 mm) were each expanded to an inner diameter of 10 mm by means of a cone-shaped jig. Then, two metal pipes were prepared which each had an outer diameter of 8 mm with two bulged portions each having an outer diameter of 10 mm and with each one end thereof having a rounded outer periphery. These metal pipes were respectively press-fitted into opposite end portions of the hose. A blind cap was threadingly attached to one of the metal pipes, and a metal valve was attached to the other metal pipe. Thereafter, regular gasoline (containing 10 vol % ethanol) was supplied into the fuel hose through the metal valve, and the fuel hose was sealed. The fuel hose was allowed to stand at 40° C. for 3000 hours (the regular gasoline was changed every week). Then, fuel permeation was measured for three days on the basis of a Diurnal Breathing Loss (DBL) pattern by the Sealed Housing for Evaporative Detection (SHED) method in accordance with California Air Resources Board (CARB). Then, fuel permeation per meter of the hose was determined on a day when the maximum fuel permeation was detected. In Tables 1 and 2, a notation "<0.1" indicates that the measured fuel permeation was below the measurement limitation (0.1 mg/m/day) of the aforesaid measurement method.

Sour Gasoline Resistance

A model of degraded gasoline was prepared by blending 5 wt % of lauroyl peroxide (LPO) in Fuel C (50% by volume of toluene+50% by volume of isoctane). Then, two metal pipes were respectively press-fitted into opposite end portions of a 10 m long fuel hose. After the model of degraded gasoline was circulated through the fuel hose at 60° C. at a pressure of 0.3 MPa for eight hours via a pressure regulator, the model of degraded gasoline was filled in the fuel hose for 16 hours. After this cycle was repeated 30 times, a part of the fuel hose was sampled and bent by 180 degrees. The sampled part was visually observed for the evaluation of the sour gasoline resistance. In Tables 1 and 2, a symbol ○ indicates that the fuel hose suffered from no abnormality, and a symbol X indicates that the fuel hose was flattened.

TABLE 1

| Material | Example 1 | 2 | 3 | 4 | 5 | 6 |
|---|---|---|---|---|---|---|
| Inner layer | PBT-TPE containing dimer acid | PBT-TPE containing dimer acid | PBT-TPE containing dimer acid | PBT-TPE containing dimer acid | PBT-TPE containing dimer acid | PBT-TPE containing dimer acid |
| Barrier layer | PBN resin | PBN resin | PBT resin | PBT resin | PEN resin | PEN resin |
| Outer layer | PBN-TPE | PBT-TPE (1) | PBN-TPE | PBT-TPE (1) | PBN-TPE | PBT-TPE (1) |
| Gasoline permeation (mg/m/day) | <0.1 | <0.1 | <0.1 | <0.1 | <0.1 | <0.1 |
| Sour gasoline resistance | ○ | ○ | ○ | ○ | ○ | ○ |

TABLE 2

| Material | Example 7 | 8 | Comparative Example 1 | 2 |
|---|---|---|---|---|
| Inner layer | PBT-TPE containing dimer acid | PBT-TPE containing dimer acid + Electrical conductive material*1 | PBT-TPE (2) | PBN-TPE |
| First intermediate layer | Blend*2 | Blend*2 | — | — |
| Barrier layer | PBN resin | PBN resin | PBN resin | PBN resin |
| Second intermediate layer | Blend*2 | Blend*2 | — | — |
| Outer layer | PBT-TPE (2) | PBT-TPE (2) | PBT-TPE (2) | PBT-TPE (2) |
| Gasoline permeation (mg/m/day) | <0.1 | <0.1 | <0.1 | <0.1 |
| Sour gasoline resistance | ○ | ○ | X | X |

*1: Electrically conductive material (carbon black) was blended in a proportion of 15 wt % in PBT-TPE containing dimer acid.
*2: Blend (trade name, GLILPET B24HNZ, available from EMS EMS-CHEMIE AG of Domat, Switzerland) of PBT (85 wt %) and polyolefin elastomer (15 wt %).

As can be understood from the aforesaid results, the fuel hoses of the examples were excellent in sour gasoline resistance, and each have a low gasoline permeability. For further improvement of the pressure resistance of the fuel hoses of Examples 1 to 6, the thickness of the barrier layer should be increased. With the barrier layer having an increased thickness, the fuel hoses would be more costly and more rigid because the PBN is costly and highly rigid. In the case of the fuel hoses of Examples 7 and 8, however, the intermediate layers composed of the blend of the PBT and the polyolefin elastomer were provided on the inner and outer peripheries of the barrier layer, so that the pressure resistance thereof was improved without increasing the thickness of the barrier layer. Further, the blend of the PBT and the polyolefin elastomer is advantageous because it has excellent low-temperature impact resistance and adhesiveness to the barrier layer and is less costly than the PBN.

On the other hand, the fuel hoses of Comparative Examples 1 and 2 were inferior in sour gasoline resistance though each have a lower gasoline permeability. This is because the inner layer was not composed of the PBT-TPE containing the dimer acid moiety, but composed of PBN-TPE or PBT-TPE. Therefore, it is supposed that the soft segment in the TPE was eroded by a peroxide in the sour gasoline, resulting in the deterioration of the sour gasoline resistance.

As described above, the inventive fuel hose has the innermost layer comprising a thermoplastic PBT elastomer containing a dimer acid moiety. Since the dimer acid moiety is introduced into the thermoplastic PBT elastomer to reduce the proportion of the soft segment (e.g., the polyether) or to entirely replace the soft segment with the dimer acid moiety, the soft segment is made less liable to be eroded by peroxide in the sour gasoline, whereby the sour gasoline resistance of the hose is effectively improved.

When the fuel hose further comprises a barrier layer of polyester resin provided around the innermost layer and an outer layer of thermoplastic polyester elastomer provided around the barrier layer, the fuel hose is made less permeable to automotive fuel and the like.

When the outer layer of the fuel hose is composed of at least one of a thermoplastic polybutylene naphthalate elastomer and a thermoplastic polybutylene terephthalate elastomer, the fuel hose is made further less permeable to automotive fuel and the like.

What is claimed is:

1. A fuel hose comprising at least one layer including an innermost layer which comprises a thermoplastic polybutylene terephthalate elastomer containing a dimer acid moiety.

2. A fuel hose as set forth in claim 1, further including a barrier layer comprising a polyester resin and provided around the innermost layer, and an outer layer comprising a thermoplastic polyester elastomer and provided around the barrier layer.

3. A fuel hose as set forth in claim 2, wherein the thermoplastic polyester elastomer for the outer layer is at least one of a thermoplastic polybutylene naphthalate elastomer and a thermoplastic polybutylene terephthalate elastomer.

4. A fuel hose as set forth in claim 1, wherein the innermost layer further comprises an electrically conductive material.

5. A fuel hose as set forth in claim 2, wherein the innermost layer further comprises an electrically conductive material.

6. A fuel hose as set forth in claim 3, wherein the innermost layer further comprises an electrically conductive material.

* * * * *